(12) United States Patent
Wang et al.

(10) Patent No.: US 12,337,428 B2
(45) Date of Patent: Jun. 24, 2025

(54) FORCE MODULATION CARTRIDGE SYSTEM FOR A DRILL BIT

(71) Applicants: CNPC USA Corporation, Houston, TX (US); BEIJING HUAMEI, INC., Beijing (CN); CHINA NATIONAL PETROLEUM CORPORATION, Beijing (CN)

(72) Inventors: Weixiong Wang, Houston, TX (US); Chris Cheng, Houston, TX (US); Qiang Fu, Korla (CN); Jingcheng Zhang, Korla (CN)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 312 days.

(21) Appl. No.: 18/182,177

(22) Filed: Mar. 10, 2023

(65) Prior Publication Data
US 2024/0300058 A1    Sep. 12, 2024

(51) Int. Cl.
*B23P 15/32* (2006.01)

(52) U.S. Cl.
CPC .................... *B23P 15/32* (2013.01)

(58) Field of Classification Search
CPC ................ B23P 15/32; E21B 10/62
See application file for complete search history.

(56) References Cited

U.S. PATENT DOCUMENTS

| | | | |
|---|---|---|---|
| 5,678,645 A | 10/1997 | Tibbitts et al. | |
| 6,142,250 A | 11/2000 | Griffin et al. | |
| 9,938,814 B2 | 4/2018 | Hay | |
| 10,000,977 B2 | 6/2018 | Jain et al. | |
| 10,494,876 B2 * | 12/2019 | Mayer | E21B 10/62 |
| 11,499,377 B2 * | 11/2022 | Zhang | E21B 12/00 |
| 11,499,378 B2 | 11/2022 | Zhang et al. | |
| 2010/0212964 A1 * | 8/2010 | Beuershausen | E21B 10/62 |
| | | | 175/57 |

(Continued)

FOREIGN PATENT DOCUMENTS

| | | |
|---|---|---|
| CN | 104564064 A | 4/2015 |
| CN | 204326973 U | 5/2015 |

(Continued)

*Primary Examiner* — Omar Flores Sanchez
(74) *Attorney, Agent, or Firm* — Craft Chu PLLC; Andrew W. Chu (57) ABSTRACT

The multi-directional force modulation cartridge system has a modular relationship the drill bit so that the cutting profile of a cutter in the drill bit can be adjusted without requiring modification of the drill bit itself. The force modulation cartridge system includes a cutter and a cartridge. The cutter can be independently replaced due to wear or replaced when the cartridge is replaced. The cartridge includes a holder, a seat, and a cartridge force member. The cartridge can have different holders and seats adjusted for different formations and drilling conditions. The alignment of the holder and the seat is set by a holder sliding angle and a seat sliding angle with the holder sliding surface and the seat sliding surface being parallel and in sliding engagement. A seat post supports the cartridge force member to exert a restoring force according to the holder sliding angle and the seat sliding angle.

20 Claims, 5 Drawing Sheets

(56) References Cited

U.S. PATENT DOCUMENTS

| | | | |
|---|---|---|---|
| 2011/0089747 A1 | 4/2011 | Helsel et al. | |
| 2013/0112480 A1 | 5/2013 | Newman | |
| 2013/0307316 A1* | 11/2013 | Roetsch | B28D 1/188 299/39.4 |
| 2019/0032410 A1* | 1/2019 | Moss, Jr. | E21B 10/325 |
| 2019/0249498 A1* | 8/2019 | Hinz | E21B 10/633 |
| 2022/0162913 A1* | 5/2022 | Zhang | E21B 12/00 |
| 2022/0162915 A1* | 5/2022 | Zhao | E21B 10/55 |
| 2022/0205356 A1* | 6/2022 | Brackin | E21B 47/08 |
| 2023/0015607 A1 | 1/2023 | Zhang et al. | |

FOREIGN PATENT DOCUMENTS

| | | |
|---|---|---|
| CN | 105604491 B | 5/2016 |
| CN | 105156035 B | 3/2017 |
| CN | 108474238 A | 8/2018 |

\* cited by examiner

FORCE MODULATION CARTRIDGE SYSTEM FOR A DRILL BIT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to cutting elements on a drill bit. More particularly, the present invention relates to a force modulation cartridge system for fixed cutters on the drill bit. Even more particularly, the present invention relates to modular adaptive cartridges for fixed cutters with different sliding angles.

2. Description of Related Art Including Information Disclosed Under 37 CFR 1.97 and 37 CFR 1.98

Polycrystalline diamond compact (PDC) cutters are used in drilling operations for oil and gas. Prior art drill bits include roller cone bits with multiple parts and rotating cutters to gouge and scrape through the rock formation. Rows of cutters moved along parts of the drill bit so that wear on the cutters was distributed. The multiple parts of the drill bit include the bit blade, bit body, cone, bearing and seal. Newer drill bits were fixed-head drill bits, which were composed of a single drill bit without any moving components. The cutters were fixed on either the bit blade or bit body of the drill bit. The fixed-head drill bits are rotated by the drill string, so moving parts on the drill bit were not needed. The cutters fixed to the parts of the drill bit determine the cutting profile for a drill bit and shear through the rock formation in place on the drill bit. The fixed cutters were more reliable under extreme heat and pressure conditions of the wellbore because there were no moving components. However, the wear on these cutters was substantial.

The further complication is that the wear on fixed cutters is not equal. There are regular sources of damage to all fixed cutters, like vibration and impact load. However, fixed cutters on different parts of the drill bit wear at different rates. For example, the fixed cutters in the cone do not wear at the same rate and manner as fixed cutters on the bit blade. In particular, the fixed cutters placed on the bit blade are on a side of the drill bit and have the highest linear cutting velocity that results in more severe wear and the most cutting force. The damage to all fixed cutters and the extra damage to fixed cutters on the bit blade cause premature failure of the drill bit, limit rate of penetration into the rock formation, and limit the footage drilled into the rock formation.

Figure 1:
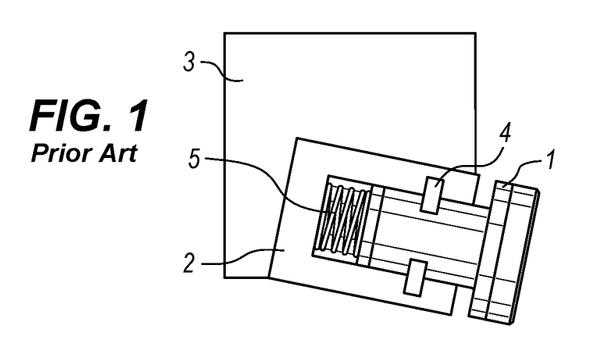
FIG. 1 is a schematic sectional view of a prior art force modulation system.
Figure 2:
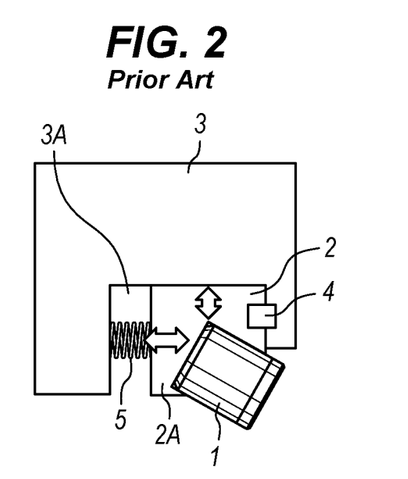
FIG. 2 is a schematic sectional view of another prior art force modulation system.

The prior art already discloses adjustments to the cutting profile of fixed cutters while drilling. FIG. 1 shows the prior art system with a fixed cutter 1 mounted in a holder 2. The holder 2 is mounted in the drill bit 3. There is a retention member 4 to hold the cutter 1 within the holder 2, and there is an elastic member 5 between the holder 2 and the drill bit 3. The elastic member 5 can be a spring, which compresses to lessen the cutting force against harder rock. The lesser force on the fixed cutter can prevent damage. The spring sets the upper limit of cutting force. Any higher load will cause the fixed cutter to retract. Various patents and publication disclose this mechanism of a spring that reduces the force on the fixed cutter, including CN105604491, published on 25 May 2016 for Li, CN204326973, published on 13 May 2015, for Ge, Huixiang et al., CN105156035, published on 29 Mar. 2017 for Hua, Jian et al., USPub 20100212964, published on 26 Aug. 2010 for Beuershausen, U.S. Pat. No. 10,000,977, issued on 19 Jun. 2018 for Jain et al, U.S. Pat. No. 6,142,250, issued on 7 Nov. 2000 for Griffin et al., and U.S. Pat. No. 5,678,645, issued on 21 Oct. 1997 to Tibbitts et al. Being a fixed cutter on refers to being fixed in position on the drill bit. The fixed cutter is not completely locked in position. The fixed cutter is not perfectly fixed in place. The fixed cutter moves toward and away from the drill bit in the one direction of the elastic member.

There have been slight modifications to the prior art system, such as the cutter with retention member directly in the drill bit without a holder. See Zongtao et al., CN104564064, published on 29 Apr. 2015 for Liu, Zhihai et al. Different elastic members are also known in U.S. Pat. No. 10,494,876, issued on 3 Dec. 2019 to Mayer et al., U.S. Pat. No. 9,938,814, issued on 10 Apr. 2018 to Hay, and CN108474238, published on 31 Aug. 2018 for Grosz, Gregory Christopher. The prior art systems remain unidirectional. The variation in force on the fixed cutter is limited to the orientation of the elastic member. The cutting profile can change only slightly as individual fixed cutters can move up and down in the one direction of the elastic member. The one-dimensional variations to the cutting profile fail to effectively protect fixed cutters on the parts of the drill bit that encounter angled forces with drilling. In particular, the fixed cutters on the bit blade or shoulder of the drill bit, known as shoulder cutters, encounter the junctions between different rock formations and require the most cutting force. There are forces against the fixed cutter by the rock formations in more than one dimension at these junctions.

Figure 3:
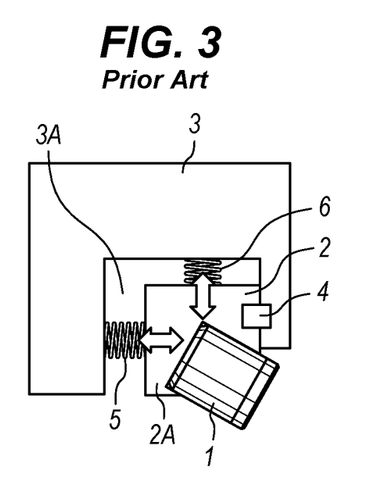
FIG. 3 is a schematic sectional view of still another prior art force modulation system.
Figure 4:
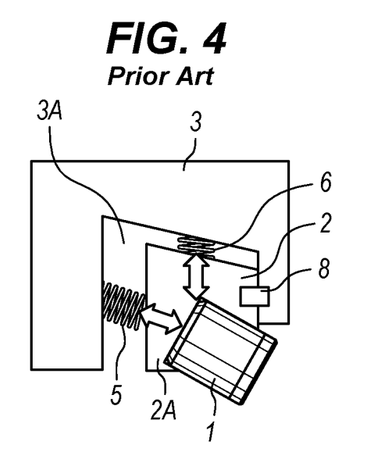
FIG. 4 is a schematic sectional view of another embodiment of the prior art force modulation system of FIG. 3.
Figure 5:
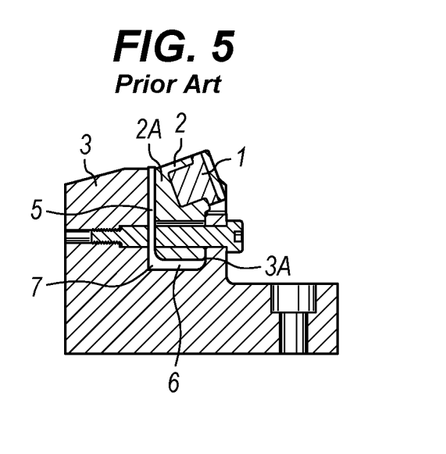
FIG. 5 is a schematic sectional view of yet another prior art force modulation system.

Advancements to the basic prior art include U.S. Pat. No. 11,499,377, issued on 15 Nov. 2022 to Zhang, Ming et al., and U.S. Pat. No. 11,499,378, issued on 15 Nov. 2022 to Zhang, Ming et al. by the present Applicant. In these advancements, a multi-directional force modulation system can move in a first direction of in and out of a bit cavity 3A of the drill bit 3, corresponding only to depth of cut, and a second direction side to side within the bit cavity 3A of the drill bit 3. FIGS. 2-5 show the advanced prior art system with a fixed cutter 1 mounted in a holder 2 with a holder body 2A. The holder 2 is mounted in the drill bit 3 with the holder body 2A fitted to the bit cavity 3A. There is an elastic member 5 between the holder 2 and the drill bit 3. There is a holder retention member 8 to hold the holding body 2A (with the cutter 1) within the bit cavity 3A in the first direction. The elastic member 5 holds the holding body 2A (with the cutter 1) within the bit cavity 3A in the second direction. The elastic member 5 can be a spring, which compresses to lessen the cutting force against harder rock. The cutting profile is now variable in more than one dimension. The first direction is set by the holder body 2A of the holder 2 relative to the bit cavity 3A of the drill bit 3 and the holder retention member 8. FIG. 3 shows a prior art embodiment with another elastic member 6 in the first direction as depth of cut and in response to excessive force in the first direction. FIG. 5 shows a prior art embodiment with a unitary elastic member 7 that combines both the elastic member 5 in the second direction and another elastic member in the first direction. FIGS. 2-5 all show different bit cavities 3A for different holder bodies 2A. The different sliding surface angles to adjust to bit performance for different formations and drilling conditions require the drill bit 3 to accommodate different holder bodies 2A of the holders 2 with customized bit cavities 3A. There is a need for an adaptive multi-directional force modulation system so that custom drill bits are not required for each different formation and drilling condition.

It is an object of the present invention to provide a force modulation system for a drill bit.

It is an object of the present invention to provide a variable cutting profile of a drill bit with fixed cutters.

It is an object of the present invention to provide a force modulation system for fixed cutters on the shoulder of the drill bit.

It is another object of the present invention to provide a multi-directional force modulation system.

It is another object of the present invention to provide a multi-directional force modulation cartridge system.

It is still another object of the present invention to provide a force modulation cartridge system with variable force in a first direction and in a second direction with the second direction being offset or even orthogonal to the first direction.

It is yet another object of the present invention to provide a force modulation cartridge system with variable force in a first direction and in a second direction with the second direction at different offsets for the same drill bit.

It is yet another object of the present invention to provide a force modulation cartridge system with variable force in a first direction and in an adjustable second direction for the same drill bit.

It is yet another object of the present invention to provide a force modulation cartridge system with variable force in a first direction and in a second direction with the second direction at different offsets according to different holder bodies for the same drill bit.

These and other objectives and advantages of the present invention will become apparent from a reading of the attached specification, drawings and claims.

BRIEF SUMMARY OF THE INVENTION

The force modulation cartridge system of the present invention moves in both a first direction in and out of a bit cavity of a drill bit, corresponding to depth of cut, and a second direction side to side within the bit cavity. The cutting profile is variable in more than one dimension, and the cutting profile itself can be modified so that the movements in the first direction and the second direction are both different to adjust bit performance, according to drilling conditions and rock formations. The present invention is an adaptive multi-directional force modulation cartridge system, and custom drill bits are no longer required for adjust bit performance for the different rock formations and drilling conditions.

The force modulation cartridge system includes a cutter and a cartridge. The cartridge comprises a holder, a seat, and a cartridge force member. The system is modular relative to the drill bit. The cartridge can have different holders and seats, while being standardized in dimensions for bit cavities in the drill bits. Any cartridge can be installed in any of the bit cavities. The holders and seats are modified, instead of the prior art holders and blade caps and bit cavities of the prior art.

The cutter of the force modulation cartridge system can be comprised of a cutter body having a cutting end and a cutting surface made integral with the cutter body. The cutter is housed within the cartridge with the cutting surface protruded from the cartridge so as to form the cutting profile. In the present invention, the cutter can be replaced independent from the cartridge or replaced with the cartridge. Due to wear on the cutter itself, the cutter can be replaced relative to the cartridge. The cartridge does not have to be replaced in the system for wear, if only the cutter is worn. If the cutting profile of the cartridge remains correct for the rock formation, then only the cutter can be changed. In other embodiments, the cutter and the holder are replaced together, when the holder needs to be replaced in order to change the cutting profile by changing cartridges.

The cartridge of the force modulation cartridge system can be comprised of a first cartridge side, a second cartridge side, and a third cartridge side, so as to be removably mounted in a bit cavity of the drill bit. The first cartridge side, the second cartridge side, and the third cartridge side are dimensioned to fit in the standardized bit cavities in the drill bits.

The holder of the force modulation cartridge system has a seat anchor side, a cutter side, and a holder sliding surface. There is a cutter side cavity at the cutter side and a seat anchor cavity at the seat anchor side. The cutter is in removable engagement with the cutter side cavity. The seat of the force modulation cartridge system has a holder anchor side, a bit side, and a seat sliding surface. There is a seat post extending from the holder anchor side.

In the holder, the holder sliding surface has a holder sliding angle, and the seat anchor cavity is parallel to the holder sliding surface. In the seat, the seat sliding surface has a seat sliding angle, and the seat post is parallel to the seat sliding surface. The seat sliding angle and the holder sliding angle matches so that the seat sliding surface is in sliding engagement with the holder sliding surface.

The cartridge force member of the force modulation cartridge system is between the holder and the seat so as to exert a restoring force on the holder according to the holder sliding angle and the seat sliding angle. The multi-directional functionality relies on these physical components to support and withstand the extreme forces exerted on the cutter in drilling operations. Embodiments of the cartridge force member include a disc spring, a component of an elastic material or a coating of elastic material.

Embodiments of the present invention include a drill bit assembly kit comprised of multiple force modulation cartridge systems, wherein each force modulation cartridge system corresponds to a different cutting profile. Alternatively, the drill bit assembly kit is comprised of a force modulation cartridge system with multiple cartridges, wherein each cartridge corresponds to a different cutting profile.

The force modulation cartridge system of the present invention has variable force in a first direction and in a second direction with the second direction at different offsets for the same drill bit. The different offsets adjust the second direction relative to the first direction. The holder and seat of a cartridge determine the offset. Each holder and corresponding seat set a different offset for variable cutting profiles in standardized cartridge dimensions.

DETAILED DESCRIPTION OF THE INVENTION

Multi-directional force modulation systems (FIGS. 2-5), that move in a first direction in and out of a bit cavity of a drill bit, corresponding only to depth of cut, and a second direction side to side within the bit cavity, have advanced beyond the conventional force modulation systems (FIG. 1), that are limited to one dimension and one direction. The cutting profile is variable in more than one dimension according to the holder and the bit cavity of the drill bit. To adjust bit performance for different formations and drilling conditions, both the holder and the drill bit must be modified. There are either customized holder bodies or customized bit cavities, which can present fabrication difficulties and additional costs to adjust bit performance in multi-directional force modulation systems. Custom drill bits or drill bits with customized bit cavity are especially expensive and complex to manufacture. The present invention is an adaptive multi-directional force modulation cartridge system so that custom drill bits are not required for each different formation and drilling condition. The cutting profile of the present invention is now variable itself so that movements in the first direction and the second directions are different.

Figure 6:
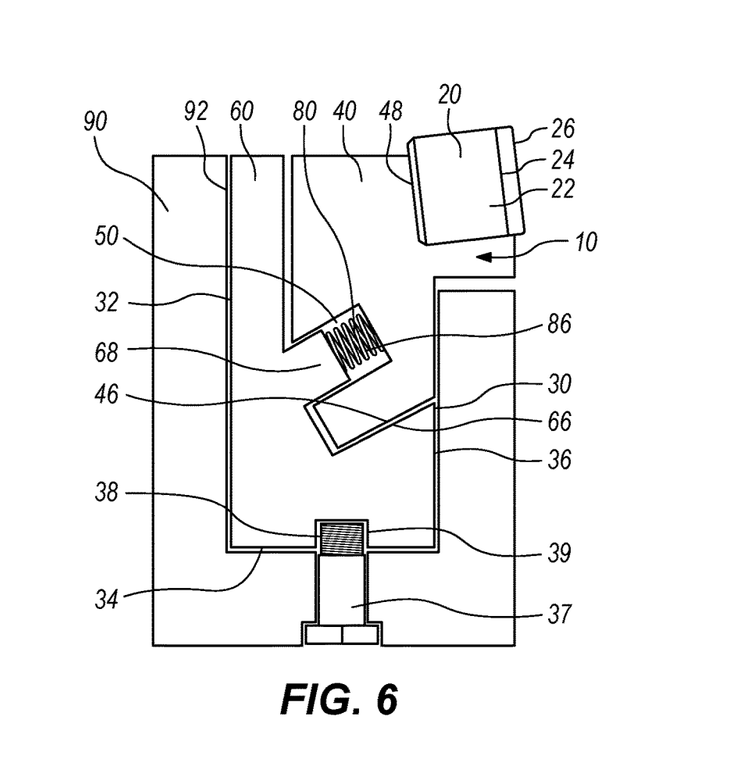
FIG. 6 is a schematic sectional view of an embodiment of a force modulation cartridge system, according to the present invention.
Figure 12:
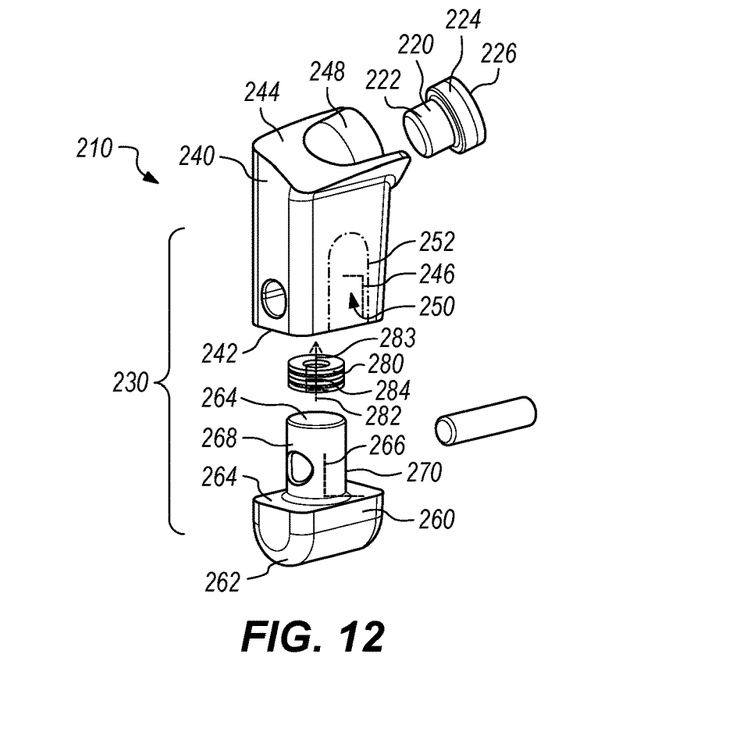
FIG. 12 is an exploded perspective view of the third embodiment of the force modulation cartridge system of FIG. 9, according to the present invention.
Figure 13:
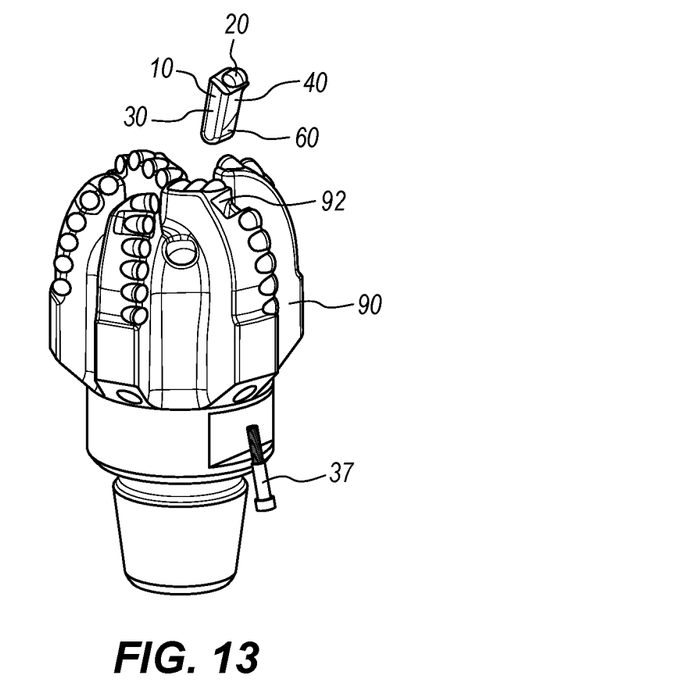
FIG. 13 is an exploded perspective view of the force modulation cartridge system, according to the present invention, for installation in a drill bit.
Figure 14:
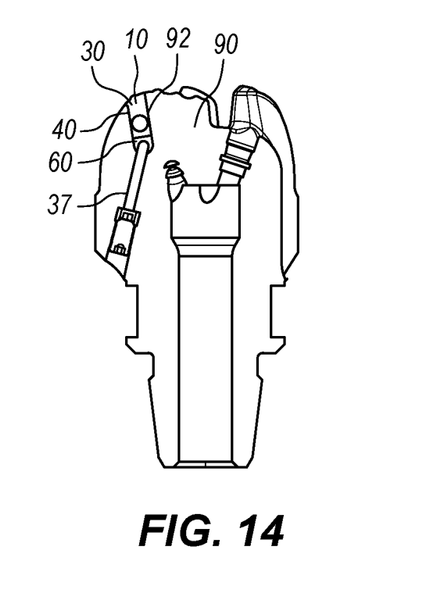
FIG. 14 is a sectional view of the assembly of the force modulation cartridge system, according to the present invention and FIG. 13 in a drill bit.
Figure 15:
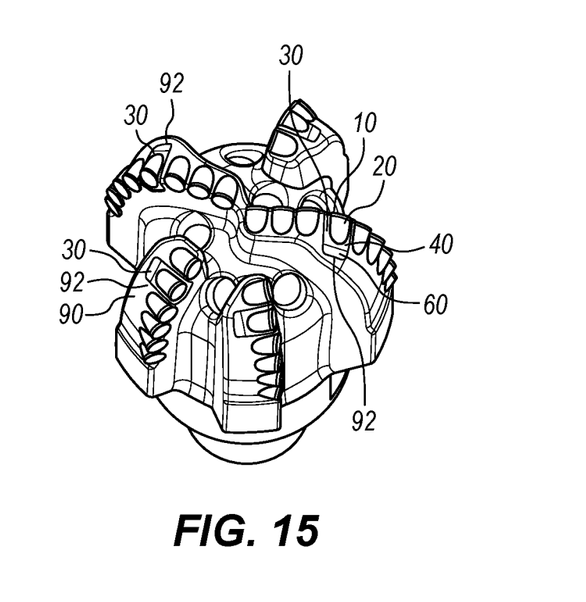
FIG. 15 is another perspective view of the force modulation cartridge system, according to the present invention and FIG. 13, as assembled in a drill bit.

The force modulation cartridge system 10 for a drill bit comprises a cutter 20 and a cartridge 30, as shown in FIG. 6. The cartridge 30 comprises a holder 40, a seat 60, and a cartridge force member 80 as in FIGS. 6-12. The system 10 is modular relative to the drill bit. The cartridge 30 can have different holders 40, 140, 240 and seats 60, 160, 260 adjusted for different formations and drilling conditions, but the cartridge 30 has the same dimensions to fit in standardized bit cavities in the drill bits. FIGS. 13-15 show a drill bit 90 with bit cavities 92. The cartridge 30 can be installed in any of the bit cavities 92 to change the force modulation cartridge system 10 for different cutting profiles. Different cutting profiles are needed to adjust for offset force vectors, such as those forces created on the shoulder cutters of FIGS. 13-15 on the bit blade 90 at junctions between different types of rock materials in a rock formation. The holders 40, 140, 240 and seats 60, 160, 260 are modified, instead of the holders and bit cavities of the prior art. The various holders 40, 140, 240 and seats 60, 160, 260 are assembled into a respective cartridge 30 of standard dimensions to fit the standardized bit cavities in a drill bit. Customized drill bits with modified bit cavities are no longer required.

Embodiments of the cutter 20, 120, 220 are shown in FIGS. 6-12. Each cutter 20, 120, 220 can be comprised of a cutter body 22, 122, 222 having a cutting end 24, 124, 224, and a cutting surface 26, 126, 226 made integral with the cutter body 22, 122, 222, at the cutting end 24, 124, 224. In the present invention, the cutters 20, 120, 220 of the system 10 can also be interchangeable. A cutter 20 can be attached to a different holder 40, 140, 240 to form the cartridge 30 with the different cutting profile. Alternatively, each holder 40, 140, 240 can have a corresponding cutter 20, 120, 220 attached for faster assembly of the cartridge 30 and faster installation in the drill bit 30. A cutter 20, 120, 220 can also be separately replaced for wear. The entire cartridge 30 does not have to be replaced for wear, if only the cutter 20, 120, 220 is worn and if the cutting profile remains correct for the rock formation.

Embodiments of the cartridge 30 are shown in FIGS. 6-12 and 16-18. The cartridge 30 is fixedly attached to the cutter 20, 120, 220. The cutter 20, 120, 220 is housed within the cartridge 30 with the cutting surface 26, 126, 226 protruded from the cartridge 30. The cutting profile corresponds to the cutting surface 26, 126, 226, and the cartridge 30.

As shown in FIG. 6, the cartridge 30 is comprised of a first cartridge side 32, a second cartridge side 34, and a third cartridge side 36, so as to be removably mounted in a bit cavity 92 of the drill bit 90. FIG. 6 shows the third cartridge side 36 being comprised of the holder 40 and the seat 60, while the first cartridge side 32 consists of the seat 60 and the second cartridge side 34 consists of the seat 60. The first cartridge side 32, the second cartridge side 34, and the third cartridge side 36 are dimensioned to fit in the standardized bit cavities in the drill bits. FIG. 6 shows the holder 40 being detachable from the third cartridge side 36. The holder 40 is positioned relative to the third cartridge side 36 according to the cartridge force member 80. The cartridge 30 can remain fixed within the bit cavity with the portion of the seat 60 as the third cartridge side 36. The seat 60 of the cartridge 30 can fit in the bit cavity without the holder 40 so that the holder 40 can be removed separately for cutter 20, 120, 220 replacements. The drill bit 90 does not have be complete disassembled to replace the cutters 20, 120, 220.

FIGS. 6 and 13-15 further show embodiments of the cartridge 30 being comprised of a cartridge connector 38 so as to be removably mounted in the bit cavity 92 of the drill bit 90. In these embodiments, the cartridge connector 38 is within the seat 60. FIGS. 6 and 13-14 show the cartridge connector 38 is a threaded hole 39 so that a screw 37 in threaded engagement with the threaded hole 39 locks the cartridge 30 to the drill bit 90. The screw 37 connects through the drill bit to hold the cartridge 30 in the bit cavity 92 for the different cutting profiles with the same installation of the cartridge 30 in the drill bit 90.

Embodiments of the holder 40, 140, 240 of the cartridge 30 are shown in FIGS. 6-12. The holder 40, 140, 240 has a seat anchor side 42, 142, 242, a cutter side 44, 144, 244, opposite the seat anchor side 42, 12, 242, and a holder sliding surface 46, 146, 246, between the seat anchor side 42, 142, 242 and the cutter side 44, 144, 244. FIGS. 6-12 also show a cutter side cavity 48, 148, 248 at the cutter side 44, 144, 244, and a seat anchor cavity 50, 150, 250 at the seat anchor side 42, 142, 242.

The cutter 20, 120, 220 is in removable engagement with the holder 40, 140 240. More particularly, the cutter body 22, 122, 22 is in removable engagement with the cutter side cavity 48, 148, 248. Again, the cutter 20, 120, 220 can be separately replaced for wear form the cutter side cavity 48, 148, 248, while the holder 40, 140, 240 is assembled in the cartridge 30 or separated from the cartridge 30.

Embodiments of the seat 60, 160, 260 of the cartridge 30 are shown in FIGS. 6-12. The seat 60, 160, 260 has a holder anchor side 62, 162, 262, a bit side 64, 164, 264 opposite the holder anchor side 62, 162, 262, and a seat sliding surface 66, 166, 266 between the holder anchor side 62, 162, 262 and the bit side 64, 164, 264. FIGS. 6-12 and 16-18 show a seat post 68, 168, 268 extending from the holder anchor side 62, 162, 262.

In the holder 40, 140, 240, the holder sliding surface 46, 146, 246 has a holder sliding angle 52, 152, 252, and the seat anchor cavity 50, 150, 250 is parallel to the holder sliding surface 46, 146, 246. In the seat 60, 160, 260, the seat sliding surface 66, 166, 266 has a seat sliding angle 70, 170, 270, and the seat post 68, 168, 268 is parallel to the seat sliding surface 66, 166, 266.

In the present invention, the seat sliding surface 66, 166, 266 is in sliding engagement with the holder sliding surface 46, 146, 246. The seat sliding angle 70, 170, 270 and the holder sliding angle 52, 152, 252 must match.

The cartridge 30 further includes a cartridge force member 80, 180, 280 between the holder 40, 140, 240 and the seat 60, 160, 260 so as to exert a restoring force 83, 183, 283 on the holder 40, 140, 240 according to the holder sliding angle 52, 152, 252 and the seat sliding angle 70, 170, 270. The cartridge 30 of the present invention relies on the alignment of the holder 40, 140, 240 and the seat 60, 160, 260 as set by the holder sliding angle 52, 152, 252 and the seat sliding angle 70, 170, 270. The multi-directional functionality relies on these physical components to support and withstand the extreme forces exerted on the cutter 20, 120, 220 in drilling operations. The restoring force 83, 183, 283 has a first direction vector 82, 182, 282 and a second direction vector 84, 184, 284 orthogonal to the first direction vector 82, 182, 282. The bit cavity and the drill bit itself support the force member in the two vectors in the prior art. In the present invention, the holder 40, 140, 240 and the seat 60, 160, 260 of the cartridge 30 support the cartridge force member 80, 180, 280, while fitted in the bit cavity. The first cartridge side 32, the second cartridge side 34, and the third cartridge side 36 still anchor the cartridge 30 relative to the drill bit 90. The support of the bit cavity 92 of the drill bit 90 on the cutter 20, 120, 220 is now standardized by the cartridge 30, even as the cutting profile of the cutter 20, 120, 220 changes. Embodiments of the present invention include both the holder 40, 140 and the seat 60, 160 sharing the two vectors, and some embodiments split the two vectors between the holder 240 and the seat 260.

Figure 7:
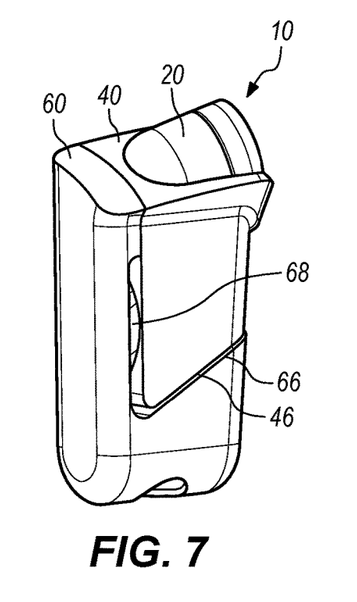
FIG. 7 is a side perspective view of a first embodiment of the force modulation cartridge system of FIG. 6, according to the present invention.
Figure 8:
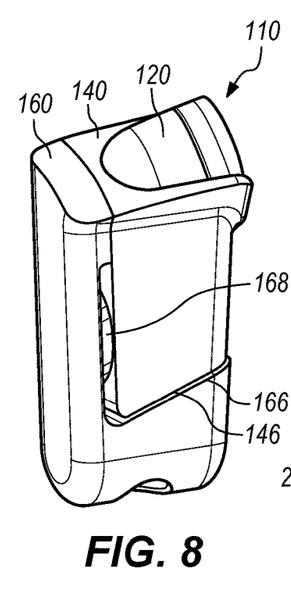
FIG. 8 is a side perspective view of a second embodiment of the force modulation cartridge system of FIG. 6, according to the present invention.
Figure 9:
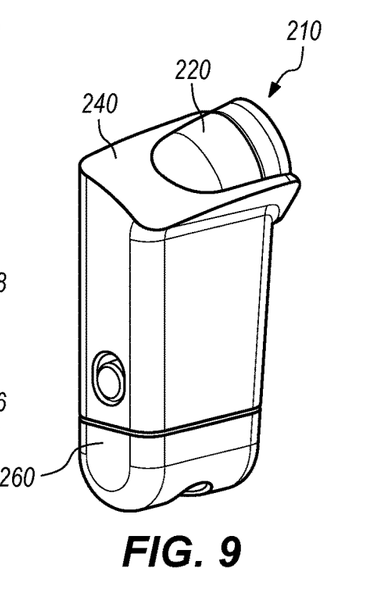
FIG. 9 is a side perspective view of a third embodiment of the force modulation cartridge system of FIG. 6, according to the present invention.
Figure 10:
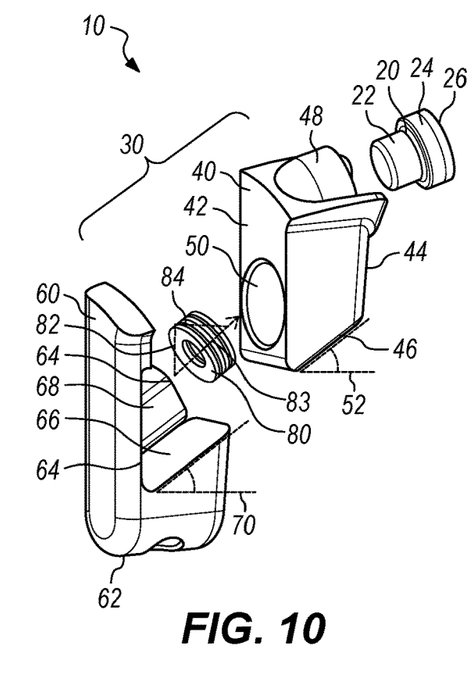
FIG. 10 is an exploded perspective view of the first embodiment of the force modulation cartridge system of FIG. 7, according to the present invention.
Figure 11:
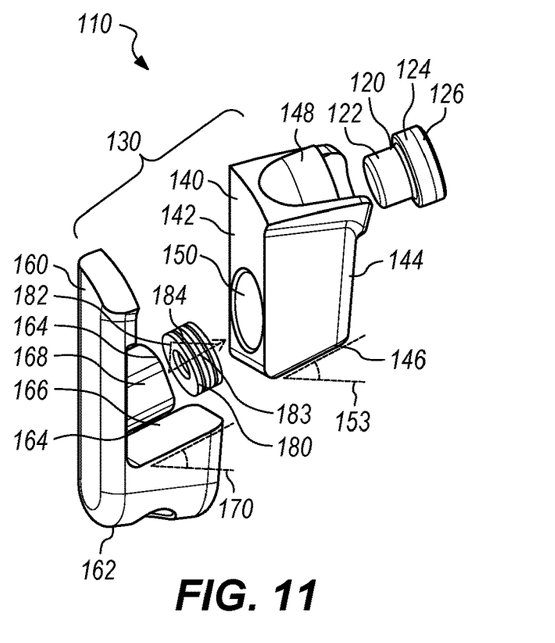
FIG. 11 is an exploded perspective view of the second embodiment of the force modulation cartridge system of FIG. 8, according to the present invention.

In the present invention, the first direction vector 82, 182, 282 can be toward the seat 60, 160, 260 so as to restore the cutter 20, 120, 220 vertically to the drill bit 90, and the second direction vector 84, 184, 284 can be toward the seat 60, 169, 260 so as to restore the cutter horizontally to the drill bit 90. FIGS. 6, 7 and 10 show an embodiment with the holder sliding angle 52 and the seat sliding angle 70 both at 30 degrees. FIGS. 8 and 11 show an embodiment with the holder sliding angle 152 and the seat sliding angle 170 both at 20 degrees. FIGS. 9 and 12 show an embodiment with the holder sliding angle 252 and the seat sliding angle 270 both at 90 degrees. In this embodiment of FIGS. 9 and 12, the seat sliding surface 266 is along the seat post 268, and the holder sliding surface 246 is within the seat anchor cavity 250. The second direction vector 284 is 90 degrees to the first direction vector in this embodiment. The holder sliding angle 252 and the seat sliding angle 270 are both 90 degrees as well. This cutting profile for the embodiment of FIGS. 9 and 12 still include the seat 260 for the same relationship between the cartridge 30, cutter 220 and the drill bit 90 of the present invention. FIGS. 6-8, 10 and 11 show embodiments of the present invention with both the holder 40, 140 and the seat 60, 160 sharing the first direction vector 82, 182 and the second direction vector 84, 184. The holder sliding angle 52 has the holder 40 supporting the restoring force in the first direction vector 82 and the second direction vector 84. The seat sliding angle 70 has the seat 60 also supporting the restoring force in the first direction vector 82 and the second direction vector 84. Similarly, the holder sliding angle 152 has the holder 140 supporting the restoring force in the first direction vector 182 and the second direction vector 184. The seat sliding angle 170 has the seat 160 also supporting the restoring force in the first direction vector 182 and the second direction vector 184. FIGS. 9 and 12 show embodiments of the present invention with the holder 240 and the seat 260 splitting the two vectors at 90 degrees. The holder sliding angle 252 has the holder 240 supporting the restoring force in the first direction vector 282. The seat sliding angle 270 has the seat 260 also supporting the restoring force in the second direction vector 284. This embodiment of FIGS. 9 and 12 is very specialized for a particular cutting profile and rock formation condition. There is still the redundancy of the seat 260 and the cartridge 230, instead of just a holder as in the prior art.

Figure 16:
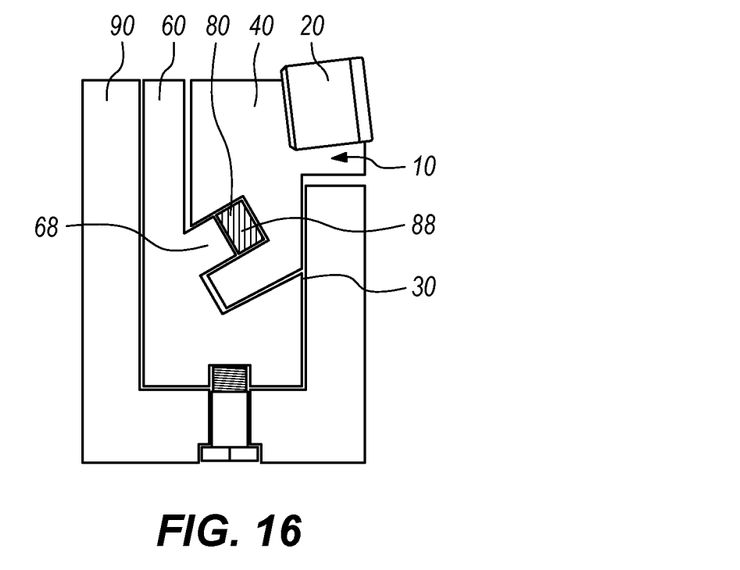
FIG. 16 is a schematic sectional view of the force modulation cartridge system, according to the present invention with a cartridge force member of an elastic material.
Figure 17:
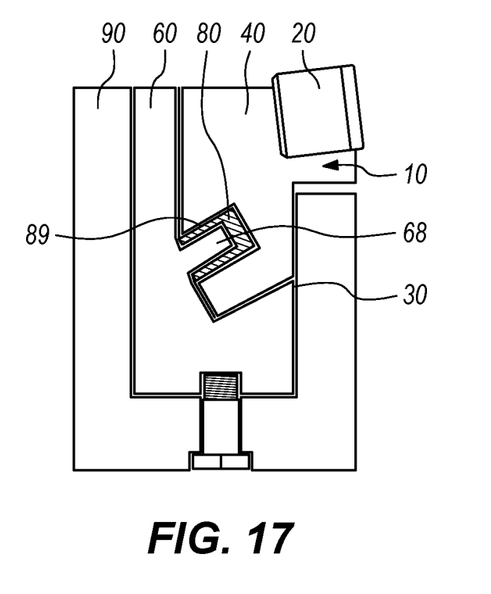
FIG. 17 is a schematic sectional view of the force modulation cartridge system, according to the present invention with another embodiment of the cartridge force member as a coating.
Figure 18:
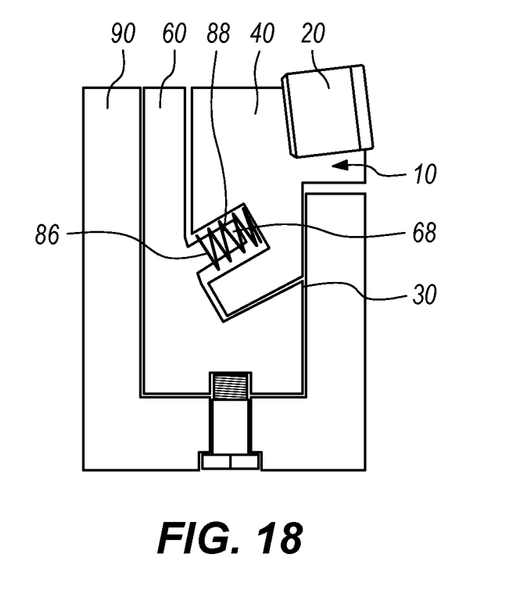
FIG. 18 is a schematic sectional view of the force modulation cartridge system, according to the present invention with another embodiment of a cartridge force member.

FIGS. 16-18 show embodiments of the cartridge force member 80, according to the present invention. FIGS. 6-12 show the cartridge force member 80 being comprised of a disc spring 86. The cartridge force member 80 is positioned within the seat anchor cavity 50 and on the seat post 68. In some embodiments, there can be a plurality of springs. Any combination of springs, compression springs, and disc springs can be a cartridge force member 80, 180, 280. FIG. 16 shows the cartridge force member 80 being comprised of an elastic material 88, such as rubber or wire woven materials. FIG. 17 shows the elastic material 88 as a coating 89. A layer of the elastic material 88 on the seat post 68 and other areas must be between the seat 60 and the holder 40. The sliding engagement of the seat post 68, 168, 268 to the seat anchor cavity 50, 150, 250 can also incorporate the cartridge force member 89. The cartridge force member 80, 180, 280 must be aligned with the seat sliding angle 70, 170, 270 and the holder sliding angle 52, 152, 252 between the holder 40, 140, 240 and the seat 60, 160, 260. The seat post 68 remains in sliding engagement with the seat anchor cavity 50 in this embodiment.

Embodiments of the present invention include a drill bit assembly kit comprised of multiple force modulation cartridge systems 10, 110, 120. Each force modulation cartridge system 10, 110, 210 corresponds to a different cutting profile as determined by the seat sliding angle 70, 170, 270 and the holder sliding angle 52, 152, 252 between the holder 40, 140, 240 and the seat 60, 160, 260. The holder sliding angle 52 and the seat sliding angle 70 are different from the other holder sliding angles 152, 252, and the other seat sliding angles 170, 270. The force modulation cartridge systems 10, 110, 210 are interchangeable in the bit cavity 92 of the drill bit 90.

In one embodiment, each holder 40, 140, 240 has their own respective cutter 20, 120, 220 and respective cartridge 30, 130, 230. The entire cartridge 30, 130, 230 is replaced in the drill bit to get a different cutting profile. The respective cutter 20, 120, 220 is changed along with the cartridge 30, 130, 230. The method of assembling a drill bit with this embodiment of a kit includes the steps of mounting the force modulation system 10 of the drill bit assembly kit in a bit cavity 92 of the drill bit 90. The cutting profile of the cartridge 30 can be used to drill the rock formation. When the drilling conditions change, such as encountering a harder rock formation, the method includes the step of removing the force modulation system 10 from the bit cavity 92 and mounting the alternate force modulation system 110, 120 in the bit cavity 92. The cutting profile of another cartridge 130 or still another cartridge 230 can now be used to drill in the new drilling conditions. The drill bit 90 does not need to be changed. The bit cavity 92 is compatible for all cartridges 30, 130, 230 in the kit.

In another embodiment of the drill bit assembly kit, the cutters 20, 120, 220 are independently installed and replaced relative to the holder 40, 140, 240 of a respective cartridge 30, 130, 230. The wear of a cutter 20, 120, 220 may require replacement before the need to change the cutting profile with a different seat sliding angle 70, 170, 270 and holder sliding angle 52, 152, 252 between the holder 40, 140, 240 and the seat 60, 160, 260. In this embodiment, the drill bit assembly kit can be comprised of the force modulation system 10 and multiple cartridges 30, 130, 230. The cutter 20 of the force modulation system 10 is now simply replaceable with alternate cutters 120, 220 for any of the cartridges 30, 130, 230. The cutters 20, 120, 220 can be identical so that the cutting profile is solely determined by the cartridge 30, 130, 230. The cutters 20, 120, 220 may also have different dimensions to further modify the cutting profile determined by the cartridge 30, 130, 230. The holder sliding angle 52 and the seat sliding angle 70 are still different from the other holder sliding angles 152, 252, and the other seat sliding angles 170, 270. Each cartridge 30, 130, 230 corresponds to a different cutting profile as determined by the seat sliding angle 70, 170, 270 and the holder sliding angle 52, 152, 252 between the holder 40, 140, 240 and the seat 60, 160, 260.

The method of assembling a drill bit with this embodiment of a kit with independent cutters 20, 120, 220, includes the steps of mounting the force modulation system 10 of the drill bit assembly kit in a bit cavity 92 of the drill bit 90. The cutting profile of the cartridge 30 can be used to drill the rock formation. When the drilling conditions change, such as encountering a harder rock formation, the method includes the step of removing the force modulation system 10 from the bit cavity 92 and replacing the cartridge 30 with an alternate cartridge 130, 230. The force modulation system 10 with the alternate cartridge 130, 230 is returned to the bit cavity 92. The cutting profile of another cartridge 130 or still another cartridge 230 can now be used to drill in the new drilling conditions. The drill bit 90 does not need to be changed. The bit cavity 92 is compatible for all cartridges 30, 130, 230 in the kit.

The method of assembling a drill bit also includes the steps of removing the cutter 20 from the cartridge 30 and placing the cutter 20 into the other cartridge 130, 230, before the step of returning the force modulation system 10 into the bit cavity 92. The cutter 20 and switching of the cutter 20 with other cutters 120, 220 is now independent from changing the cutting profile by cartridge 30, 130, 230.

The present invention is a multi-directional force modulation cartridge system for a drill bit. Instead of being restricted to the one direction of in and out of the drill bit cavity, corresponding only to depth of cut, the system can also move cutters in another direction side to side within the drill bit cavity. The force modulation cartridge system has particular usefulness for fixed cutters on the blade of the bit body or shoulder of the drill bit. These cutters on the blade of the bit body or shoulder of the drill bit typically drill the rock formation at junctions between different types of rock materials. There is a higher risk of excessive force to damage cutters at these joints. The force modulation of the cartridge system can avoid address this excessive force.

The force modulation cartridge system has variable force in a first direction and in a second direction with the second direction at different offsets for the same drill bit. The first direction and the second direction are angled offset from each other. The first and second directions can be orthogonal to each other. The different offsets adjust the second direction relative to the first direction. The holder and seat of a cartridge determine the offset. The holder and seat can each share the variable force in the two directions. The holder and the seat can distribute the variable force according to the two directions also. Different cartridges have different combinations of a holder and seat in standardized cartridge dimensions. Each holder and corresponding seat set a different offset for variable cutting profiles in each standardized cartridge dimensions.

The present invention is a force modulation cartridge system that avoids switching out entire drill bits in order to change the cutting profile for rock formations to be drilled. Instead of machining different bit cavities for each force modulation system corresponding to a different cutting profile, the drill bits can have the same bit cavities. The drill bit can be standardized. The cartridges that fit one bit cavity will now fit all bit cavities. The cartridges are modular with the bit cavities so that only the cartridges need to change in order to modify the cutting profile.

In the present invention, the cartridge relies on the alignment of the holder and the seat as set by the respective holder sliding angles and the seat sliding angles. The multi-directional functionality relies on these physical components to support and withstand the extreme forces exerted on the cutter in drilling operations.

The foregoing disclosure and description of the invention is illustrative and explanatory thereof. Various changes in the details of the illustrated structures, construction and method can be made without departing from the true spirit of the invention.

We claim:

1. A force modulation cartridge system for a drill bit, comprising:
    a cutter being comprised of a cutter body having a cutting end, and a cutting surface made integral with said cutter body at said cutting end; and
    a cartridge being fixedly attached to said cutter, said cutter being housed within said cartridge with said cutting surface being protruded from said cartridge,
    wherein said cartridge comprises:
        a holder having a seat anchor side, a cutter side opposite said seat anchor side, a holder sliding surface between said seat anchor side and said cutter side, a cutter side cavity at said cutter side, and a seat anchor cavity at said seat anchor side,
    wherein said cutter is in removable engagement with said holder,
    wherein said holder sliding surface has a holder sliding angle, and
    wherein said seat anchor cavity is parallel to said holder sliding surface;
        a seat having a holder anchor side, a bit side opposite said holder anchor side, a seat sliding surface between said holder anchor side and said bit side, and a seat post extending from said holder anchor side,
    wherein said seat sliding surface in in sliding engagement with said holder sliding surface,
    wherein said seat sliding surface has a seat sliding angle, and
    wherein said seat post is parallel to said seat sliding surface; and
        a cartridge force member between said holder and said seat so as to exert a restoring force on said holder according to said holder sliding angle and said seat sliding angle.

2. The force modulation cartridge system, according to claim 1, wherein said cartridge is comprised of a first cartridge side, a second cartridge side, and a third cartridge side, so as to be removably mounted in a bit cavity of the drill bit.

3. The force modulation cartridge system, according to claim 2, wherein said third cartridge side is comprised of said holder and said seat.

4. The force modulation cartridge system, according to claim 3, wherein said holder is detachable from said third cartridge side.

5. The force modulation cartridge system, according to claim 4, wherein said holder is positioned relative to said third cartridge side according to said cartridge force member.

6. The force modulation cartridge system, according to claim 1, wherein said cartridge is comprised of a cartridge connector so as to be removably mounted in the bit cavity of the drill bit.

7. The force modulation cartridge system, according to claim 6, wherein said cartridge connector is within said seat.

8. The force modulation cartridge system, according to claim 1, wherein said cutter body is in removable engagement with said cutter side cavity.

9. The force modulation cartridge system, according to claim 1, wherein said restoring force has a first direction vector and a second direction vector orthogonal to said first direction vector.

10. The force modulation cartridge system, according to claim 9, wherein said first direction vector is toward said seat so as to restore the cutter vertically to the drill bit, and wherein said second direction vector is toward said seat so as to restore the cutter horizontally to the drill bit.

11. The force modulation cartridge system, according to claim 1, wherein said cartridge force member is comprised of a disc spring.

12. The force modulation cartridge system, according to claim 1, wherein said cartridge force member is comprised of an elastic material.

13. The force modulation cartridge system, according to claim 1, wherein cartridge force member is positioned within said seat anchor cavity and on said seat post.

14. The force modulation cartridge system, according to claim 1, wherein cartridge force member is aligned parallel to said holder sliding angle and said seat sliding angle.

15. The force modulation cartridge system, according to claim 9, wherein said second direction vector is at ninety degrees to the first direction vector, said holder sliding angle and said seat sliding angle being ninety degrees,
    wherein said holder sliding surface is within said seat anchor cavity, and
    wherein said seat sliding surface is around said seat post.

16. A drill bit assembly kit, comprising:
    a force modulation system, according to claim 1; and
    an alternate force modulation system, comprising:
        an alternate cutter being comprised of an alternate cutter body having an alternate cutting surface; and
        an alternate cartridge being fixedly attached to said alternate cutter, said alternate cutter being housed within said alternate cartridge with said alternate cutting surface being protruded from said alternate cartridge,
    wherein said alternate cartridge comprises:
        an alternate holder having an alternate seat anchor side, an alternate cutter side opposite said alternate seat anchor side, an alternate holder sliding surface between said seat anchor side and said cutter side, an alternate cutter side cavity at said alternate cutter side, and an alternate seat anchor cavity at said alternate seat anchor side,
    wherein said alternate cutter is in removable engagement with said alternate holder,
    wherein said alternate holder sliding surface has an alternate holder sliding angle, and
    wherein said alternate seat anchor cavity is parallel to said alternate holder sliding surface;
        an alternate seat having an alternate holder anchor side, an alternate bit side opposite said alternate holder anchor side, an alternate seat sliding surface between said alternate holder anchor side and said alternate bit side, and an alternate seat post extending from said alternate holder anchor side, wherein said alternate seat sliding surface in in sliding engagement with said alternate holder sliding surface, wherein said alternate seat sliding surface has an alternate seat sliding angle, and wherein said alternate seat post is parallel to said alternate seat sliding surface; and an alternate cartridge force member between said alternate holder and said alternate seat so as to exert an alternate restoring force on said alternate holder according to said alternate holder sliding angle and said alternate seat sliding angle, wherein said holder sliding angle and said seat sliding angle are different from said alternate holder sliding angle and said alternate seat sliding angle, and wherein said force modulation system and said alternate modulation system are interchangeably removably mounted in a bit cavity of a drill bit.

17. A method of assembling a drill bit, the method comprising the steps of:
mounting said force modulation system of said drill bit assembly kit of claim 16 in a bit cavity of the drill bit;
removing said force modulation system from said bit cavity; and
mounting said alternate force modulation system in said bit cavity.

18. A drill bit assembly kit, comprising:
a force modulation system, according to claim 1; and
an alternate cartridge, comprising:
an alternate holder having an alternate seat anchor side, an alternate cutter side opposite said alternate seat anchor side, an alternate holder sliding surface between said seat anchor side and said cutter side, an alternate cutter side cavity at said alternate cutter side, and an alternate seat anchor cavity at said alternate seat anchor side,
wherein said alternate cutter is in removable engagement with said alternate holder,
wherein said alternate holder sliding surface has an alternate holder sliding angle, and
wherein said alternate seat anchor cavity is parallel to said alternate holder sliding surface;
an alternate seat having an alternate holder anchor side, an alternate bit side opposite said alternate holder anchor side, an alternate seat sliding surface between said alternate holder anchor side and said alternate bit side, and an alternate seat post extending from said alternate holder anchor side,
wherein said alternate seat sliding surface in in sliding engagement with said alternate holder sliding surface,
wherein said alternate seat sliding surface has an alternate seat sliding angle, and
wherein said alternate seat post is parallel to said alternate seat sliding surface; and
an alternate cartridge force member between said alternate holder and said alternate seat so as to exert an alternate restoring force on said alternate holder according to said alternate holder sliding angle and said alternate seat sliding angle,
wherein said holder sliding angle and said seat sliding angle are different from said alternate holder sliding angle and said alternate seat sliding angle, and
wherein said cartridge and said alternate cartridge are interchangeably removably mounted in a bit cavity of a drill bit.

19. A method of assembling a drill bit, the method comprising the steps of:
mounting said force modulation system of said drill bit assembly kit of claim 18 in a bit cavity of the drill bit;
removing said force modulation system from said bit cavity;
replacing said cartridge with said alternate cartridge; and
returning said force modulation system into said bit cavity.

20. The method of assembling a drill bit, according to claim 19, wherein the step of replacing said cartridge with said alternate cartridge further comprises the steps of:
removing said cutter from said cartridge; and
placing said cutter into said alternate cartridge, before the step of returning said force modulation system into said bit cavity.

* * * * *